United States Patent
Saski et al.

(10) Patent No.: US 10,629,909 B2
(45) Date of Patent: Apr. 21, 2020

(54) ENERGY STORAGE DEVICE

(71) Applicant: GS Yuasa International Ltd., Kyoto-shi, Kyoto (JP)

(72) Inventors: Takeshi Saski, Kyoto (JP); Tomonori Kako, Kyoto (JP); Shota Ito, Kyoto (JP); Ryosuke Shimokawa, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 0 days.

(21) Appl. No.: 15/781,666

(22) PCT Filed: Dec. 5, 2016

(86) PCT No.: PCT/JP2016/005055
§ 371 (c)(1),
(2) Date: Jun. 5, 2018

(87) PCT Pub. No.: WO2017/098715
PCT Pub. Date: Jun. 15, 2017

(65) Prior Publication Data
US 2019/0006674 A1    Jan. 3, 2019

(30) Foreign Application Priority Data
Dec. 8, 2015   (JP) ................................ 2015-239512

(51) Int. Cl.
*H01M 4/587*    (2010.01)
*H01G 11/24*    (2013.01)
(Continued)

(52) U.S. Cl.
CPC ............ *H01M 4/587* (2013.01); *H01G 11/24* (2013.01); *H01G 11/32* (2013.01); *H01G 11/38* (2013.01);
(Continued)

(58) Field of Classification Search
None
See application file for complete search history.

(56) References Cited

U.S. PATENT DOCUMENTS

2004/0137328 A1    7/2004  Kim et al.
2004/0170898 A1    9/2004  Shibuya
(Continued)

FOREIGN PATENT DOCUMENTS

JP    H09027314 A    1/1997
JP    H10199526 A    7/1998
(Continued)

OTHER PUBLICATIONS

Extended European Search Report (EESR) dated Nov. 20, 2018 issued in the corresponding European patent application No. 16872617.2.
(Continued)

*Primary Examiner* — Wyatt P McConnell
(74) *Attorney, Agent, or Firm* — Rankin, Hill & Clark LLP (57) ABSTRACT

An energy storage device having sufficient energy density and sufficient power is provided. In this embodiment, an energy storage device that includes a negative electrode containing an active material layer including an active material is provided. The active material layer includes particulate graphite as the active material. A particle diameter frequency distribution of the graphite includes a first peak and a second peak which appears in a region where a particle diameter is larger than a particle diameter of the first peak, the particle diameter of the first peak is equal to or less than 10 μm and the particle diameter of the second peak is more than 10 μm. The active material layer further includes a particulate high hardness active material which has higher hardness than the graphite.

6 Claims, 8 Drawing Sheets

(51) Int. Cl.
| | |
|---|---|
| *H01G 11/42* | (2013.01) |
| *H01G 11/38* | (2013.01) |
| *H01G 11/32* | (2013.01) |
| *H01M 4/36* | (2006.01) |
| *H01M 4/133* | (2010.01) |
| *H01M 4/62* | (2006.01) |
| *H01M 4/1393* | (2010.01) |
| *H01G 11/86* | (2013.01) |
| *H01M 10/0525* | (2010.01) |
| *H01G 11/10* | (2013.01) |
| *H01G 11/46* | (2013.01) |
| *H01G 11/52* | (2013.01) |
| *H01M 4/02* | (2006.01) |

(52) U.S. Cl.
CPC ............ *H01G 11/42* (2013.01); *H01G 11/86* (2013.01); *H01M 4/133* (2013.01); *H01M 4/1393* (2013.01); *H01M 4/364* (2013.01); *H01M 4/623* (2013.01); *H01M 4/625* (2013.01); *H01G 11/10* (2013.01); *H01G 11/46* (2013.01); *H01G 11/52* (2013.01); *H01M 10/0525* (2013.01); *H01M 2004/021* (2013.01); *H01M 2004/027* (2013.01); *Y02E 60/13* (2013.01)

(56) References Cited

U.S. PATENT DOCUMENTS

2005/0221185 A1* 10/2005 Sakata .................. H01M 4/133
429/231.8
2017/0110730 A1    4/2017 Tanaka

FOREIGN PATENT DOCUMENTS

| | | |
|---|---|---|
| JP | H11025981 A | 1/1999 |
| JP | 2000226206 A | 8/2000 |
| JP | 2003323895 A | 11/2003 |
| JP | 2005071918 A | 3/2005 |
| JP | 2005108611 A | 4/2005 |
| JP | 2008166047 A | 7/2008 |
| JP | 2010073618 A | 4/2010 |
| JP | 2011009051 A | 1/2011 |
| JP | 2013004307 A | 1/2013 |
| JP | 2013089327 A | 5/2013 |
| JP | 2013201104 A | 10/2013 |
| JP | 2015141772 A | 8/2015 |
| WO | 2015152114 A1 | 10/2015 |

OTHER PUBLICATIONS

International Search Report dated Feb. 7, 2017 filed in PCT/JP2016/005055.

* cited by examiner

ENERGY STORAGE DEVICE

TECHNICAL FIELD

The present invention relates to an energy storage device such as a lithium ion secondary battery.

BACKGROUND ART

Conventionally, a lithium ion secondary battery that includes a negative electrode having an active material layer containing an active material is known.

As this type of battery, a battery is known whose active material layer contains, as active materials, a composite carbon material (A) formed by coating a pressure-treated carbon material (a) with a carbonaceous material or a graphite material, and a carbon material (B) (For example, Patent Document 1). In the battery described in Patent Document 1, the pressure-treated carbon material (a) is spherical natural graphite, and the carbon material (B) is one or more selected from natural graphite (C), artificial graphite (D), coated graphite (E) formed by coating a non-pressure-treated raw carbon material with a carbonaceous material or a graphitic material, and non-graphitizing carbon (F).

In the battery described in Patent Document 1, since the active material layer of the negative electrode contains graphite as an active material, the energy density can be sufficient.

However, although the battery described in Patent Document 1 can have sufficient energy density, there are cases where the battery does not necessarily have sufficient power.

PRIOR ART DOCUMENTS

Patent Documents

Patent Document 1: JP-A-2013-201104

SUMMARY OF THE INVENTION

Problems to be Solved by the Invention

It is an object of the present invention to provide an energy storage device having sufficient energy density and sufficient power.

Means for Solving the Problems

An energy storage device according to the present invention includes a negative electrode containing an active material layer including an active material. The active material layer includes particulate graphite as the active material. A particle diameter frequency distribution of the graphite includes a first peak and a second peak which appears in a region where a particle diameter is larger than a particle diameter of the first peak, the particle diameter of the first peak is equal to or less than 10 µm and the particle diameter of the second peak is more than 10 µm. The active material layer further includes a particulate high hardness active material which has higher hardness than the graphite. The energy storage device can have sufficient energy density and sufficient power.

In the energy storage device, the high hardness active material may include particulate non-graphitizing carbon. The energy storage device can have more sufficient energy density and more sufficient power.

In the energy storage device, an average particle diameter of the high hardness active material may be more than 10 µm. The particle diameter of the first peak is equal to or less than 10 µm and an average particle diameter of the high hardness active material is more than 10 µm, therefore the active material layer includes graphite smaller than the high hardness active material. Accordingly, the graphite which is relatively small can enter a gap between the high hardness active materials approaching each other, and the active material is sufficiently filled in the active material layer. Therefore, the energy storage device can surely have sufficient energy density.

In the energy storage device, the average particle diameter of the high hardness active material may be more than the particle diameter of the second peak. In this case, the graphite enters a gap between the high hardness active materials approaching each other, and the active material is sufficiently filled in the active material layer. Therefore, the above energy storage device can surely have sufficient energy density.

In the energy storage device, the graphite includes a pore in an inside thereof. A discharge reaction may occur on an inner surface in addition to an outer surface of the graphite because the graphite includes a pore in the inside thereof. The power can be large due to a contribution of the discharge reaction on the inner surface. Accordingly, the energy storage device has surely sufficient power.

Advantages of the Invention

According to the invention, the energy storage device having sufficient energy density and sufficient power can be provided.

MODE FOR CARRYING OUT THE INVENTION

Hereinafter, an embodiment of an energy storage device according to the present invention will be explained with reference to FIG. 1 to FIG. 8. The energy storage device is a primary battery, a secondary battery, capacitor or the like. In this embodiment, as an example of the energy storage device, the secondary battery capable of discharging and charging will be explained. The terms of constitutional members (constitutional elements) are for the present embodiment and may be different from the terms of constitutional members (constitutional elements) in Background Art.

The energy storage device 1 is a nonaqueous secondary battery. Specifically, the energy storage device is a lithium ion secondary battery using an electron transfer which occurs with a lithium ion transfer. The energy storage device 1 provide an electrical energy. The energy storage device 1 is used singly or plurally. Specifically, the energy storage device 1 is used singly when required power and voltage are low. The energy storage device 1 is used for an energy storage apparatus 100 in combination with other energy storage device 1 when at least one of the required power and voltage is large. In the energy storage apparatus 100, the energy storage device 1 used in the energy storage apparatus 100 provides an electrical energy.

As shown in FIG. 1 to FIG. 8, the energy storage device 1 includes an electrode assembly including a positive electrode 11 and a negative electrode 12, a case 3 housing the electrode assembly 2, and an external terminal 7 which is disposed outside the case 3 and electrically connected with the electrode assembly 2. The energy storage device 1 includes a current collector 5 which electrically connects the electrode assembly 2 with the external terminal 7 or the like in addition to the electrode assembly 2, the case 3 and the external terminal 7.

The electrode assembly 2 is formed by winding a layered product 22 in a state where the positive electrode 11 and the negative electrode 12 are electrically isolated each other by a separator 4.

Figure 7:
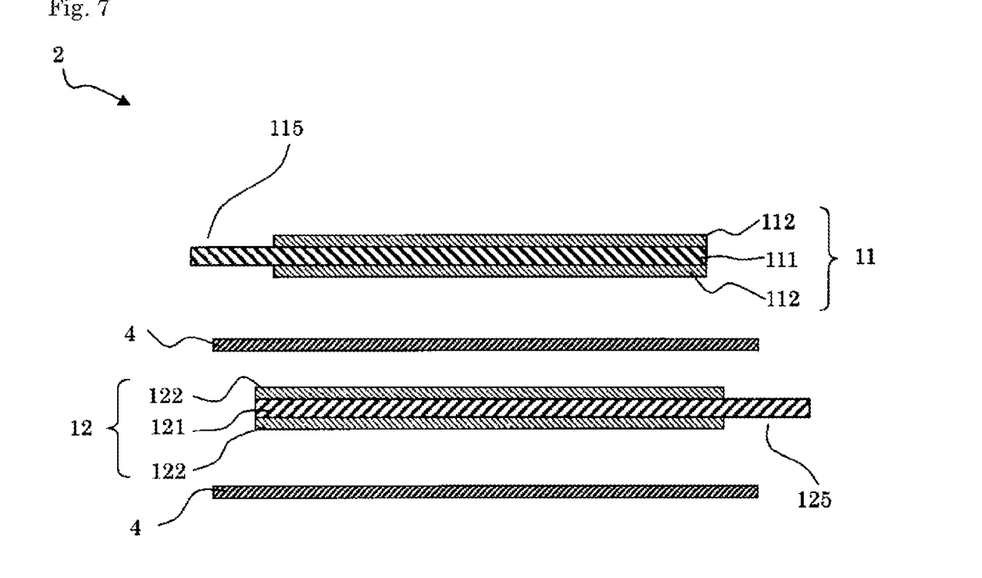
FIG. 7 is a cross-sectional view of a positive electrode, a negative electrode and a separator which are layered (VII-VII cross-section in FIG. 6).

The positive electrode 11 includes a metal foil 111 (positive substrate) and an active material layer 112 which is disposed on a surface of the metal foil 111 and includes an active material. In the embodiment, the active material layers 112 are layered on each surface of the metal foil 111. The active material layers 112 are disposed on both surfaces in a thickness direction of the metal foil 111. A thickness of the positive electrode is normally 40 μm or more and 150 μm or less.

The metal foil 111 has a band shape. The metal foil 111 of the positive electrode 11 of the present embodiment is, for example, an aluminum foil. The positive electrode 11 has a portion 115 not coated with the positive active material layer 112 (a portion where no positive active material layer is formed) at one edge portion in the width direction which is a short side direction of the band shape.

The positive active material layer 112 includes a particulate active material, a particulate conduction aid, and a binder. The active material of the positive electrode 11 is a compound capable of absorbing and releasing lithium ions. A thickness of the positive active material layer 112 (for one layer) is usually 15 μm or more and 70 μm or less. A weight per unit area of the positive active material layer 112 (for one layer) is 5 mg/cm² or more and 25 mg/cm² or less. A density of the positive active material layer 112 is 2 g/cm³ or more and 4 g/cm³ or less. The density is a density in one layer disposed so as to cover one surface of the metal foil 111.

The active material of the positive electrode is, for example, a lithium metal oxide. Specifically, the active material of the positive electrode is, for example, a composite oxide ($Li_xNi_aO_2$, $Li_xCo_bO_2$, $Li_xMn_cO_4$, $Li_xNi_aCo_b$-$Mn_cO_2$, or the like) represented by $Li_xMeO_e$ (Me represents one or more transition metal) or a polyanion compound ($Li_tFe_uPO_4$, $Li_tMn_uPO_4$, $Li_tMn_uSiO_4$, $Li_tCo_uPO_4$ or the like) represented by $Li_tMe_u(XO_v)_w$ (Me represents one or more transition metal and X represents, for example, P, Si, B or V).

In the present embodiment, the active material of the positive electrode 11 is a lithium metal composite oxide represented by a chemical composition of $Li_xNi_aCo_bMn_c$-$M_dO_e$ (M is a metal element other than Ni, Co and Mn, $0<x\leq1.3$, $a+b+c+d=1$, $0\leq a\leq 1$, $0\leq b\leq 1$, $0\leq c\leq 1$, $0\leq d\leq 1$, and $1.7\leq e\leq 2.3$). It may be possible that $0<a<1$, $0<b<1$, $0<c<1$, $d=0$.

The lithium metal composite oxide represented by the chemical composition of $Li_xNi_aCo_bMn_cM_dO_e$ is $LiN_{1/3}Co_{1/3}Mn_{1/3}O_2$, $LiNi_{1/6}Co_{2/3}Mn_{1/6}O_2$, $LiCoO_2$ or the like.

A binder used in the positive active material layer 112 is, for example, polyvinylidene fluoride(PVdF), copolymer of ethylene and vinyl alcohol, polymethylmethacrylate, polyethylene oxide, polypropylene oxide, polyvinyl alcohol, polyacrylic acid, polymethacrylic acid, and stylene-butadien rubber. The binder of the present embodiment is polyvinylidene fluoride.

The conduction aid of the positive active material layer 112 is a carbonaceous material containing carbon in an amount of 98 mass % or more. Examples of the carbonaceous material are Ketjen Black (registered trademark), acetylene black, graphite and the like. The positive active material layer 112 of the present embodiment has acetylene black as the conduction aid.

The negative electrode 12 has a metal foil 121 (negative substrate) and a negative active material layer 122 formed on the metal foil 121. In the present embodiment, the negative active material layer 122 is overlaid on both surfaces of the metal foil 121, respectively. The metal foil 121 has a band shape. The metal foil 121 of the negative electrode of this embodiment is, for example, a copper foil. The negative electrode 12 has a portion 125 not coated with the negative active material layer 122 (a portion where no negative active material layer is formed) at one edge portion in the width direction which is a short side direction of the band shape. A thickness of the negative electrode 12 (for one layer) is usually 40 μm or more and 150 μm or less.

The negative active material layer 122 includes a particulate active material and a binder. The negative active material layer 122 is disposed so as to face the positive electrode 11 with the separator 4 interposed therebetween. A width of the negative active material layer 122 is larger than a width of the positive active material layer 112.

A thickness of the negative active material layer 122 (for one layer) is usually 10 μm or more and 50 μm or less. A weight per unit area of the negative active material layer 122 (for one layer) is 1 mg/cm² or more and 8 mg/cm² or less. A density of the negative active material layer 122 (for one layer) is usually 1.0 g/cm³ or more and 1.7 g/cm³ or less.

The negative active material layer 122 is formed into a porous state by voids between the active materials. A porosity of the negative active material layer 122 is usually 20% or more and 50% or less. The porosity is determined from the measurement result by mercury intrusion technique. Specifically, the porosity can be determined by calculation from a true density and bulk volume of the negative active material layer 122 and the pore volume measured by mercury intrusion technique.

The active material of the negative electrode 12 can contribute to an electrode reaction of a charge reaction and a discharge reaction in the negative electrode 12. Examples of the active material of the negative electrode 12 include carbon materials such as graphite, non-graphitizing carbon (hard carbon, soft carbon) and the like, and materials capable of causing an alloying reaction with lithium ions, such as silicon (Si) and tin (Sn) and the like. Further, as the active material of the negative electrode 12, ones obtained by mixing these materials can be mentioned. Here, graphite refers to a carbon material in which an average lattice spacing (d 002) of a (002) plane determined by a wide angle X-ray diffraction method is less than 0.340 nm. Also, non-graphitizing carbon means carbon in which a lattice spacing of the (002) plane measured from the wide angle X-ray diffraction method in a discharged state is 0.340 nm or more.

In the present embodiment, the negative active material layer 122 contains graphite and a particulate active material having a higher hardness than graphite (hereinafter also referred to as high hardness active material A) as active materials. As the high hardness active material A, non-graphitizing carbon or a material that causes an alloying reaction with lithium ions as described above can be mentioned. Specifically, the negative active material layer 122 contains graphite and non-graphitizing carbon as active materials, and more specifically, graphite and hard carbon as active materials.

The hardness of the active material is measured by Dynamic Ultramicro Hardness Tester (such as model number "DUH-211S", manufactured by Shimadzu Corporation). The measurement conditions are as follows, for example. The hardness of the active material is indicated by, for example, Vickers hardness.

Sample: Particles are embedded in a resin and fixed with the resin, and the surface of the resin is polished.

Sample size: Φ 25×10 t (mm)

Measuring indenter: Triangular pyramid indenter (made of diamond) having an angle between ridge lines of 115°.

Test type: Load to unload test g

Testing force: 49 (mN)

Load speed: 2.685 (mN/sec)

Retention time: 5 (sec)

The volume based particle diameter frequency distribution of the graphite contained in the negative active material layer 122 has a first peak and a second peak appearing at a larger particle diameter than that of the first peak. A particle diameter of the first peak is 10 µm or less, and a particle diameter of the second peak is larger than 10 µm. The particle diameter of the peak is a particle diameter at the local maximum point of the peak. The particle diameter $D_1$ of the first peak is usually 1 µm or more and 10 µm or less, and may be 5 µm or more. The particle diameter $D_2$ of the second peak is usually larger than 10 µm (exceeds 10 µm) and 30 µm or less and may be 20 µm or less. It should be noted that the relationship between the first peak and the second peak may be satisfied between adjacent peaks, and the particle diameter frequency distribution may have three or more peaks.

In the particle diameter frequency distribution of graphite, the frequency with respect to the particle diameter of graphite is expressed. The particle diameter frequency distribution can be determined by measurement using a laser diffraction-scattering type particle diameter distribution measurement apparatus. The particle diameter frequency distribution is determined on a volume basis of particles. When measuring the particle diameter frequency distribution of graphite in a produced battery, for example, the battery is charged until reaching 4.2 V at a 1.0 C rate, and then the battery is further discharged for 3 hours at a constant voltage of 4.2 V, and then constant current discharge is performed up to 2.0 V at a 1.0 C rate. Thereafter, constant voltage discharge is performed at 2.0 V for 5 hours. Subsequently, the battery is disassembled under a dry atmosphere. The electrode (active material layer) is taken out and immersed in a solvent (such as N-methylpyrrolidone or water) in which the binder of the active material layer is dissolved to dissolve the binder. An undissolved matter is separated by filtration and dried. Thereafter, graphite (2.2 g/cc) as an active material and non-graphitizing carbon (1.5-2.1 g/cc) are separated using a centrifugal separator or a specific gravity gradient tube. The particle diameter frequency distribution of each separated active material is measured using a particle diameter distribution measurement apparatus.

The particle diameter $D_1$ of the first peak and the particle diameter $D_2$ of the second peak satisfy a relational expression of $1 \leq D_2/D_1 \leq 30$. A value of $D_2/D_1$ can be adjusted, for example, by increasing or decreasing the difference in the average particle diameter between graphite materials to be mixed when mixing the graphite materials having different average particle diameters in preparation of the negative electrode 12. The value of $D_2/D_1$ may be 2 or more and 5 or less, or may be 3 or less.

The difference between the particle diameter $D_1$ of the first peak and the particle diameter $D_2$ of the second peak is usually 2 µm or more and 15 µm or less and may be 10 µm or less. Such a difference can be adjusted, for example, by increasing or decreasing the difference in the average particle diameter when mixing graphite materials having different average particle diameters in preparation of the negative electrode 12.

In the particle diameter frequency distribution, the ratio of the frequency (%) of the local maximum point of the second peak to the frequency (%) of the local maximum point of the first peak is usually 0.1 or more and 1.0 or less. Such a ratio can be adjusted, for example, by changing the mixing ratio when mixing graphite materials having different average particle diameters in preparation of the negative electrode 12.

In the particle diameter frequency distribution, when the particle diameter at which the frequency is minimized between the first peak and the second peak is denoted by Dx, the proportion of particles having a particle diameter of Dx or less is 10% or more and 50% or less with respect to the whole graphite particles. The proportion of particles having a particle diameter equal to or smaller than Dx can be obtained from the ratio of the area of the part having a particle diameter of Dx or less to the total area in the particle diameter frequency distribution. The proportion of particles having a particle diameter of Dx or less is usually determined by a software program attached to the particle diameter distribution measurement apparatus described above.

Examples of the graphite of the active material of the negative electrode 12 include natural graphite and artificial graphite. Examples of natural graphite include, for example, scale-like graphite and earthy graphite. Examples of the scale-like graphite include flaky graphite and the like. As the artificial graphite, there can be mentioned, for example, one obtained by baking an organic substance such as coal tar pitch, aromatic hydrocarbon, nitrogen-containing cyclic compound, sulfur-containing cyclic compound and graphitizing it.

Figure 8:
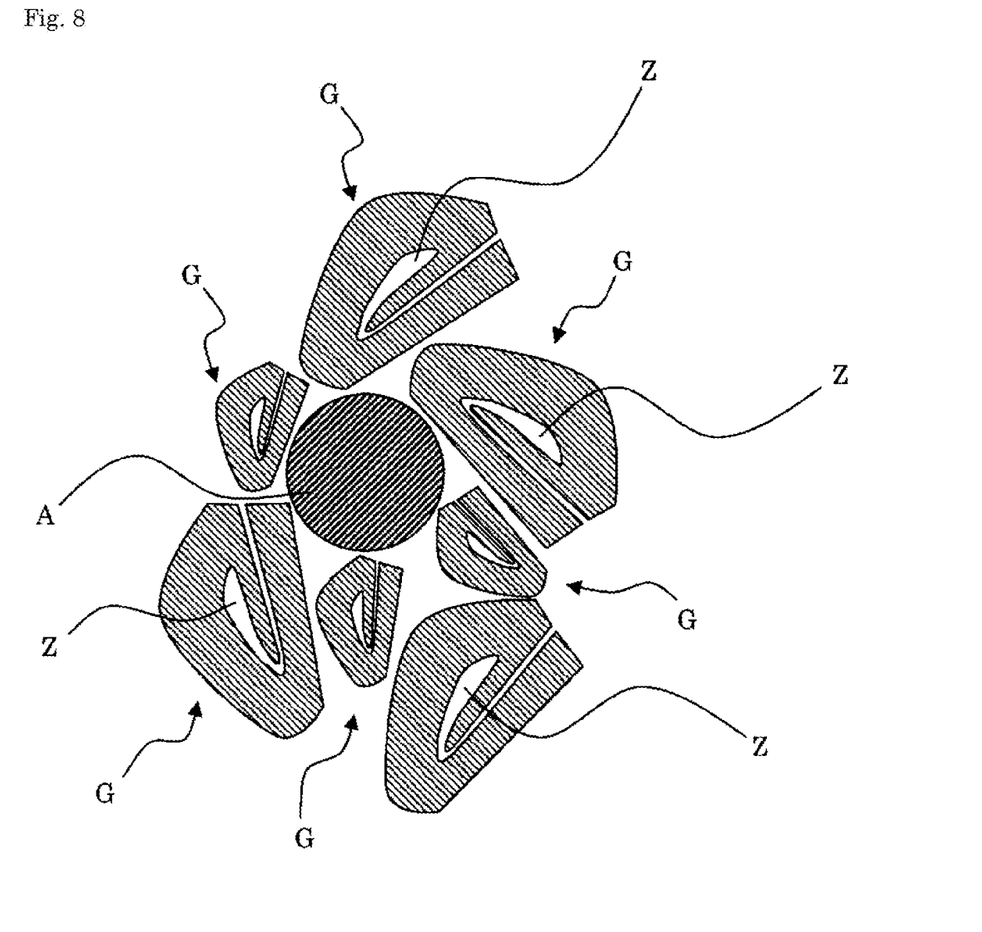
FIG. 8 is a schematic cross-sectional view of particulate graphite and high hardness active material.

In the present embodiment, as shown in FIG. 8, graphite has a pore in which a part of the outer surface enters into an inside of the graphite. That is, graphite is a particle having a pore Z communicating with a space outside the particle. Therefore, an electrolyte solution described later enters the pore Z, and the electrolyte solution enters the inside of the graphite, and thereby the graphite is impregnated with the electrolyte solution. In addition, the graphite having the pore Z formed therein has a shape in which flaky natural graphite is folded, for example. In addition, graphite may be secondary particles in which primary particles are agglomerated. Such secondary particles have pores which have a void between the primary particles and a part of the outer surface enters into an inside of the graphite and have pores communicating with the space outside the secondary particles.

The negative active material layer 122 usually contains graphite in an amount of 80 mass % or more and 95 mass % or less. The negative active material layer 122 usually contains the high hardness active material A as described above in an amount of 3 mass % or more and 10 mass % or less. The mass ratio of the graphite to the high hardness active material A is usually 10 or more and 30 or less.

An average particle diameter of the high hardness active material A contained in the negative active material layer 122 is usually larger than 10 μm and 25 μm or less. That is, the average particle diameter of non-graphitizing carbon such as hard carbon is usually larger than 10 μm and 25 μm or less. The average particle diameter of the high hardness active material A is determined by obtaining the particle diameter corresponding to the cumulative degree of 50% (D50) from the particle diameter frequency distribution measured in the same manner as in the above graphite. Details of the method for measuring the average particle diameter of the high hardness active material A are described in Examples.

The binder used for the negative active material layer 122 is the same as the binder used for the positive active material layer 112. The binder of the present embodiment is polyvinylidene fluoride.

In the negative active material layer 122, a ratio of the binder may be 2 mass % or more and 10 mass % or less with respect to the total mass of the negative electrode active material and the binder.

In an electrode assembly 2 of the present embodiment, the positive electrode 11 and the negative electrode 12 configured as described above are wound in a state of being insulated by the separator 4. That is, in the electrode assembly 2 of the present embodiment, a layered product 22 of the positive electrode 11, the negative electrode 12, and the separator 4 is wound. The separator 4 is a member having insulating properties. The separator 4 is disposed between the positive electrode 11 and the negative electrode 12. Thereby, the positive electrode 11 and the negative electrode 12 are insulated from each other in the electrode assembly 2 (more specifically, the layered product 22). Further, the separator 4 holds the electrolyte solution in a case 3. Thereby, lithium ions move between the positive electrode 11 and the negative electrode 12 which are alternately laminated with the separator 4 interposed therebetween during charge-discharge of the energy storage device 1.

The separator 4 has a band shape. The separator 4 has a porous separator substrate. The separator 4 of the present embodiment has only a separator substrate. The separator 4 is disposed between the positive electrode 11 and the negative electrode 12 in order to prevent a short circuit between the positive electrode 11 and the negative electrode 12.

The separator substrate is, for example, formed porous by a fabric, a non-woven fabric, or a porous membrane. A material of the separator substrate may be a polymer compound, glass, ceramic or the like. The polymer compound may be, for example, polyester such as polyacrylonitrile (PAN), polyamide(PA), polyethyleneterephthalate(PET) or the like, polyolefine(PO) such as polypropylene(PP), polyethylene(PE) or the like, and cellulose.

Figure 6:
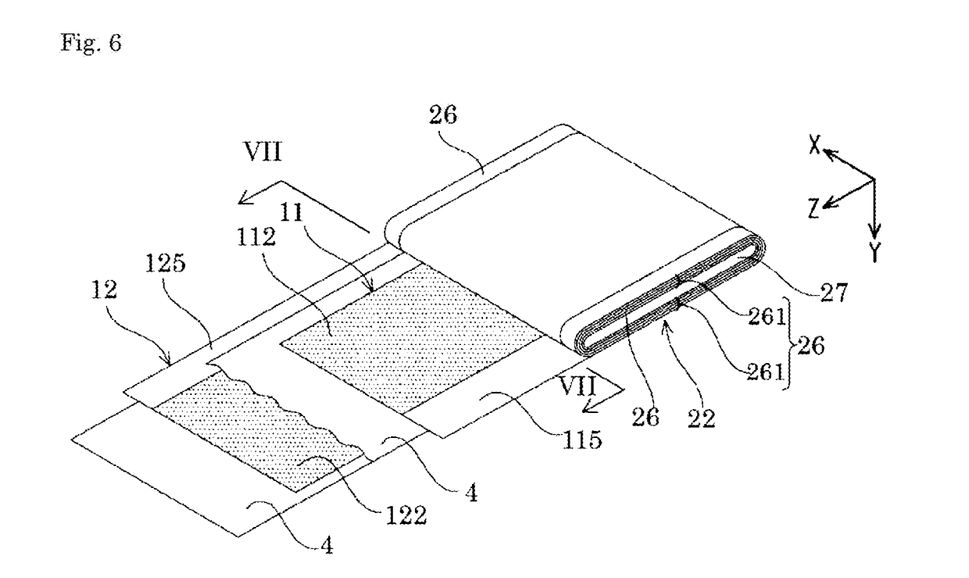
FIG. 6 is a view for explaining a configuration of the electrode assembly of the energy storage device according to the embodiment

The width (dimension in the short side direction of the band shape) of the separator 4 is slightly larger than the width of the negative active material layer 122. The separator 4 is disposed between the positive electrode 11 and the negative electrode 12 superimposed in a state of being displaced in the width direction so that the positive active material layer 112 and the negative active material layer 122 overlap with each other. At this time, as shown in FIG. 6, the uncoated portion 115 of the positive electrode 11 and the uncoated portion 125 of the negative electrode 12 do not overlap. That is, the uncoated portion 115 of the positive electrode 11 protrudes in the width direction from the region where the positive electrode 11 and the negative electrode 12 overlap with each other, and the uncoated portion 125 of the negative electrode 12 protrudes in the width direction (a direction opposite to a protrusion direction of the uncoated portion 115 of the positive electrode 11) from the region where the positive electrode 11 and the negative electrode 12 overlap with each other. The electrode assembly 2 is formed by winding the positive electrode 11, the negative electrode 12, and the separator 4 in a layered state, that is, the layered product 22. An uncoated layered portion 26 of the electrode assembly 2 is composed of the portion where only the uncoated portion 115 of the positive electrode 11 or the uncoated portion 125 of the negative electrode 12 is layered.

The uncoated layered portion 26 is a portion which is electrically conducted to a current collector 5 in the electrode assembly 2. The uncoated layered portion 26 is divided into two portions (a bisected uncoated layered portions) 261 with a hollow portion 27 (see FIG. 6) sandwiched therebetween viewed in a direction of a winding central axis of wound the positive electrode 11, the negative electrode 12 and the separator 4.

The uncoated layered portion 26 configured as described above is provided at each pole of the electrode assembly 2. That is, the uncoated layered portion 26 in which only the uncoated portion 115 of the positive electrode 11 is layered constitutes an uncoated layered portion of the positive electrode 11 in the electrode assembly 2, and the uncoated layered portion 26 in which only the uncoated portion 125 of the negative electrode 12 is layered constitutes an uncoated laminated portion of the negative electrode 12 in the electrode assembly 2.

The case 3 has a case main body 31 having an opening and a cover plate 32 which blocks (closes) the opening of the case main body 31. The case 3 houses the electrolyte solution in an internal space together with the electrode assembly 2, the current collector 5 and the like. The case 3 is formed of a metal resistant to the electrolyte solution. The case 3 is formed of, for example, an aluminum-based metallic material such as aluminum or an aluminum alloy. The case 3 may be made of a metal material such as stainless steel and nickel, or a composite material obtained by bonding a resin such as nylon to aluminum, or the like.

The electrolyte solution is a nonaqueous solution. The electrolyte solution is obtained by dissolving an electrolyte salt in an organic solvent. The organic solvent is, for example, a cyclic carbonate ester such as propylene carbonate and ethylene carbonate, a chain carbonate ester such as dimethyl carbonate, diethyl carbonate and ethylmethyl carbonate. The electrode salt is $LiClO_4$, $LiBF_4$, $LiPF_6$ or the like. In the present embodiment, the electrolyte solution is obtained by dissolving 0.5 to 1.5 mol/L of $LiPF_6$ in a mixture solvent in which ethylene carbonate, dimethyl carbonate and ethylmethyl carbonate are mixed by a predetermined ratio.

The case 3 is formed by joining a circumferential edge portion of the opening of the case main body 31 to a peripheral edge portion of the rectangular cover plate 32 in a state of superimposing them. Further, the case 3 has an internal space defined by the case main body 31 and the cover plate 32. In the present embodiment, the circumferential edge portion of the opening of the case main body 31 is joined to the peripheral edge portion of the cover plate 32 by welding.

Figure 1:
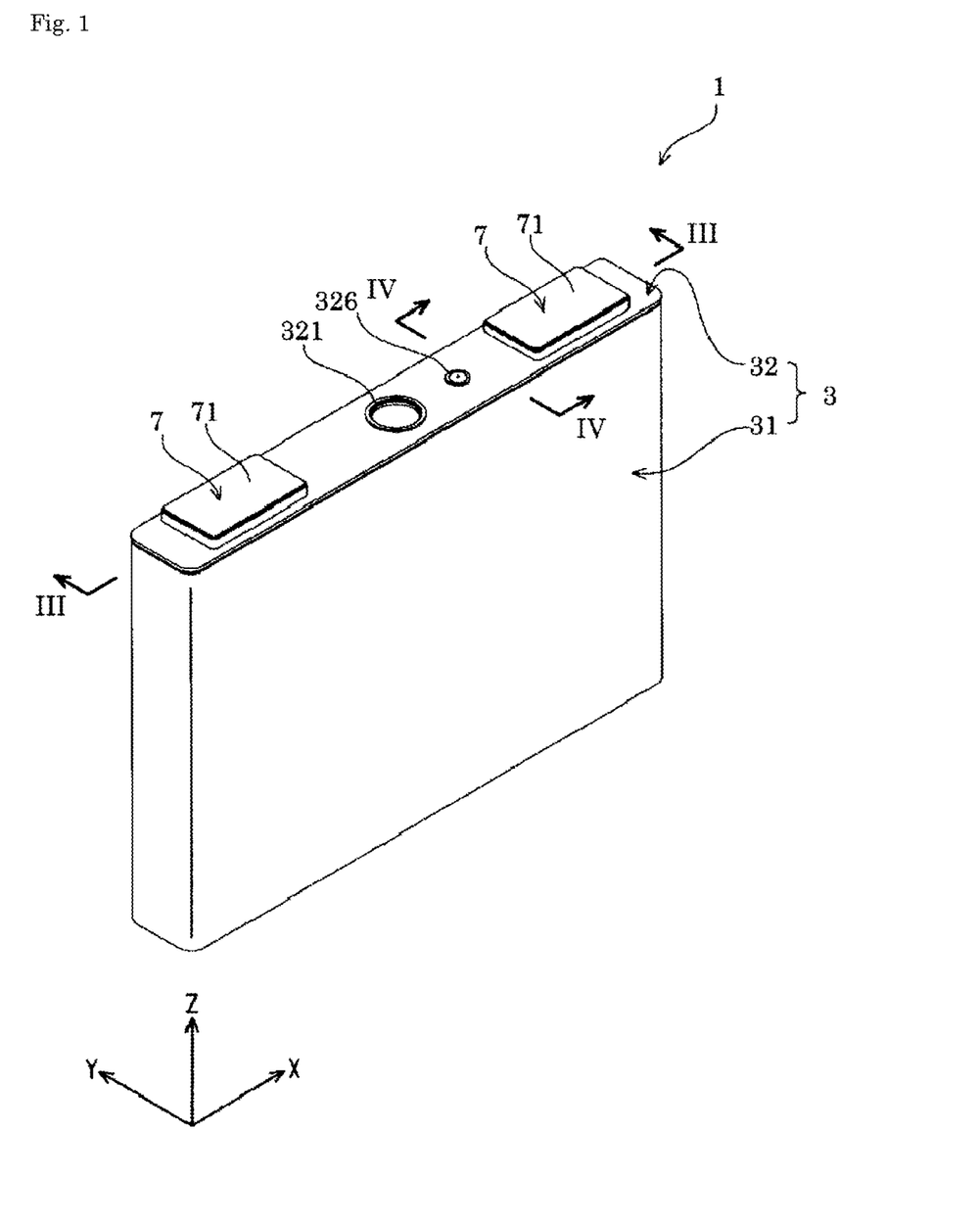
FIG. 1 is a perspective view of an energy storage device according to an embodiment.
Figure 2:
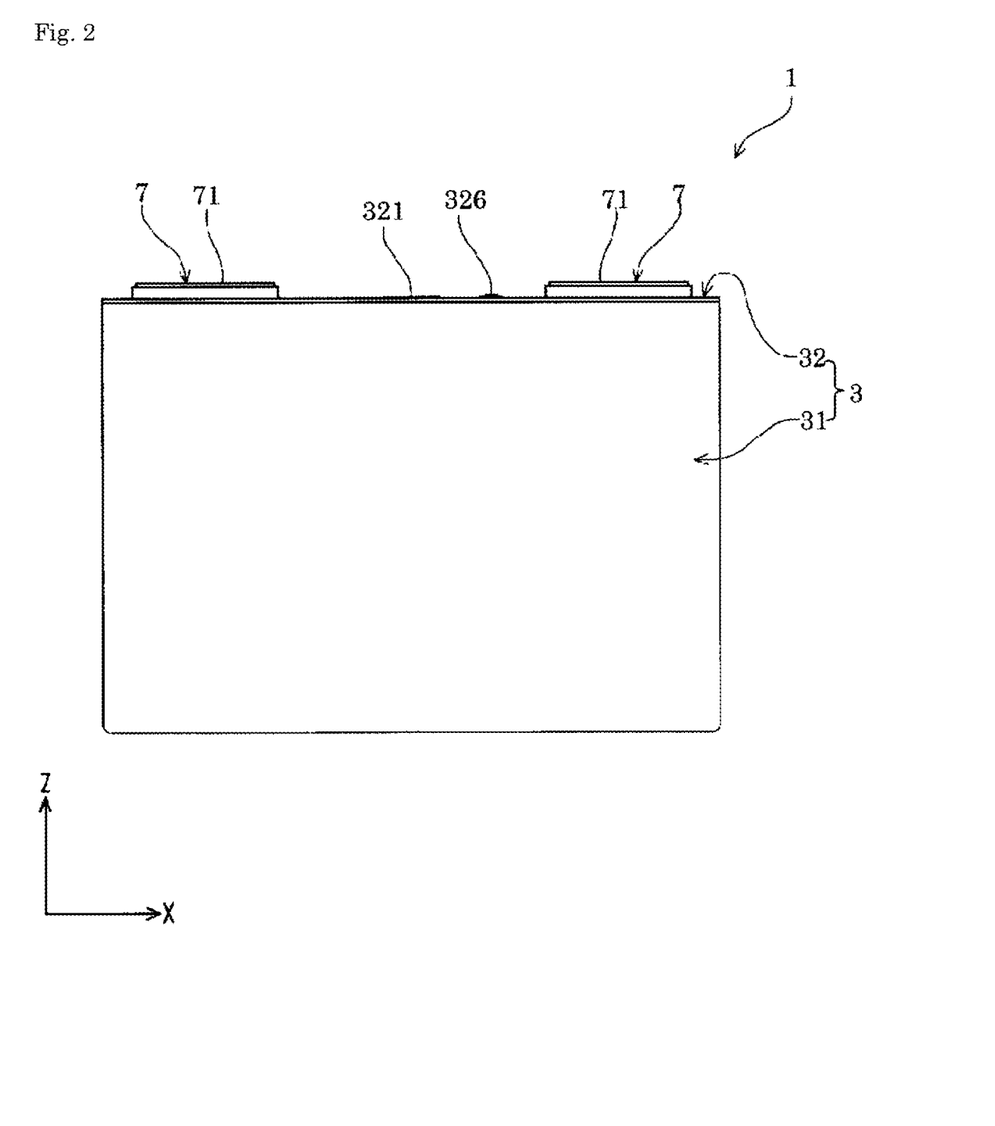
FIG. 2 is a front view of the energy storage device according to the embodiment.

Hereinafter, as shown in FIG. 1, the long side direction of the cover plate 32 is defined as the X axis direction, the short side direction of the cover plate 32 is defined as the Y axis direction, and the normal direction of the cover plate 32 is defined as the Z axis direction.

The case main body 31 has a rectangular cylindrical shape (that is, a bottomed rectangular cylindrical shape) in which one end portion in an opening direction (Z axis direction) is closed. The cover plate 32 is a plate-shaped member that blocks the opening of the case main body 31.

The cover plate 32 has a gas release valve 321 capable of discharging the gas inside the case 3 to the outside. The gas release valve 321 discharges the gas from the inside of the case 3 to the outside when the internal pressure of the case 3 rises to a predetermined pressure. The gas release valve 321 is provided in the central portion of the cover plate 32 in the X axis direction.

The case 3 is provided with an electrolyte solution filling hole for filling an electrolyte solution. The electrolyte solution filling hole communicates the inside of the case 3 with the outside. The electrolyte solution filling hole is provided in the cover plate 32. The electrolyte solution filling hole is sealed (blocked) by an electrolyte solution filling plug 326. The electrolyte solution filling plug 326 is fixed to the case 3 (the cover plate 32 in the example of the present embodiment) by welding.

An external terminal 7 is a portion to be electrically connected to the external terminal 7 of another energy storage device 1 or an external device or the like. The external terminal 7 is formed of a member having conductivity. For example, the external terminal 7 is formed of a metal material having high weldability such as an aluminum-based metal material, for example, aluminum or an aluminum alloy, a copper-based metal material, for example, copper or a copper alloy, or the like.

The external terminal 7 has a surface 71 on which a bus bar or the like can be welded. The surface 71 is a flat surface. The external terminal 7 has a plate shape which expands along the cover plate 32. Specifically, the external terminal 7 has a rectangular plate shape as viewed in the Z axis direction.

The current collector 5 is disposed in the case 3 and is directly or indirectly connected to the electrode assembly 2 so as to be energizable. The current collector 5 of the present embodiment is connected to the electrode assembly 2 so as to be energizable via a clip member 50. That is, the energy storage device 1 includes a clip member 50 that connects the electrode assembly 2 and the current collector 5 so as to be energizable.

Figure 3:
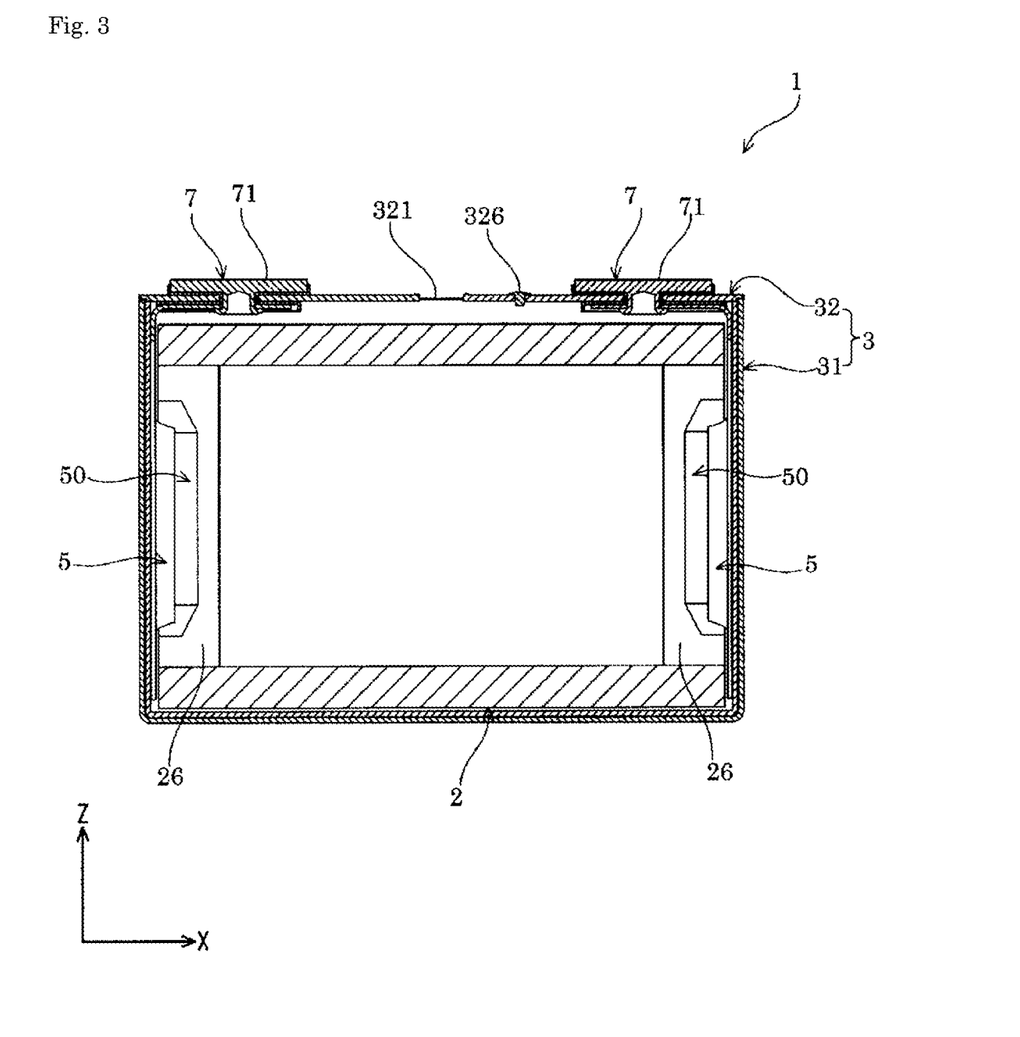
FIG. 3 is a cross-sectional view at III-III line in FIG. 1.
Figure 4:
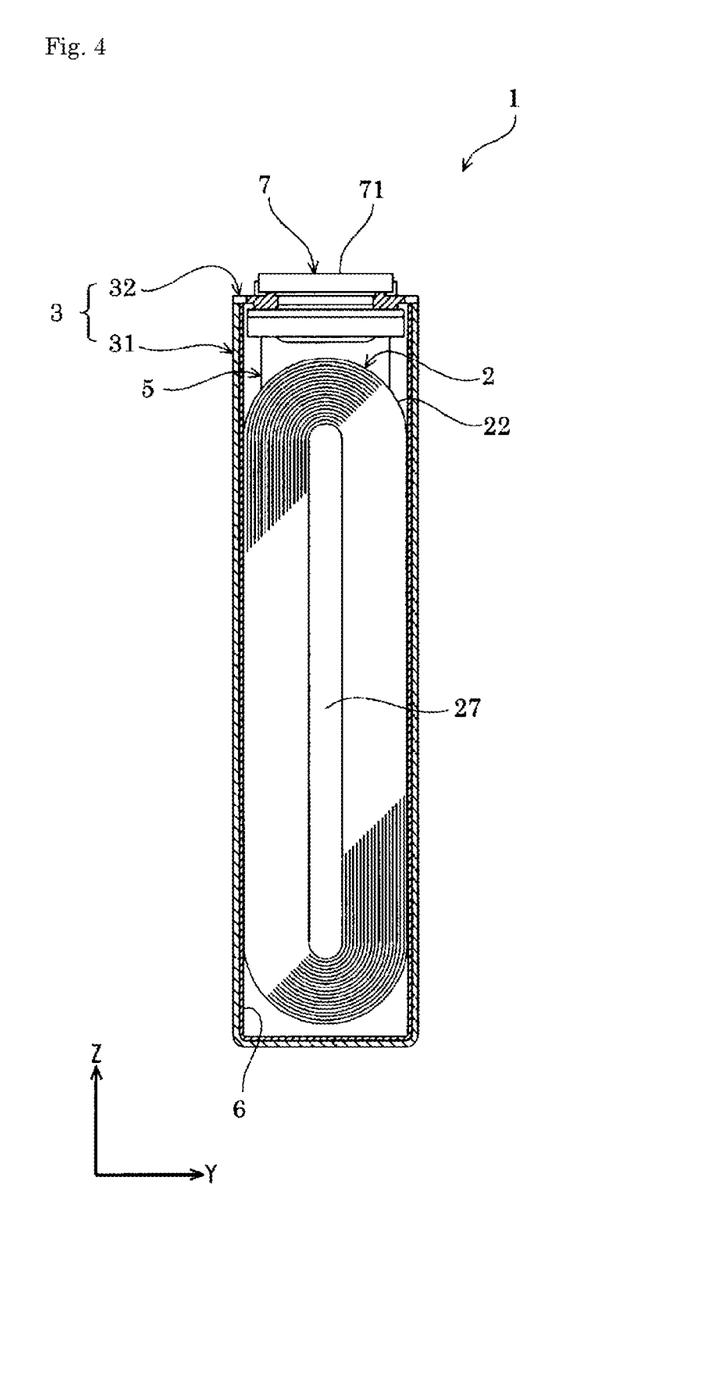
FIG. 4 is a cross-sectional view at IV-IV line in FIG. 1.
Figure 5:
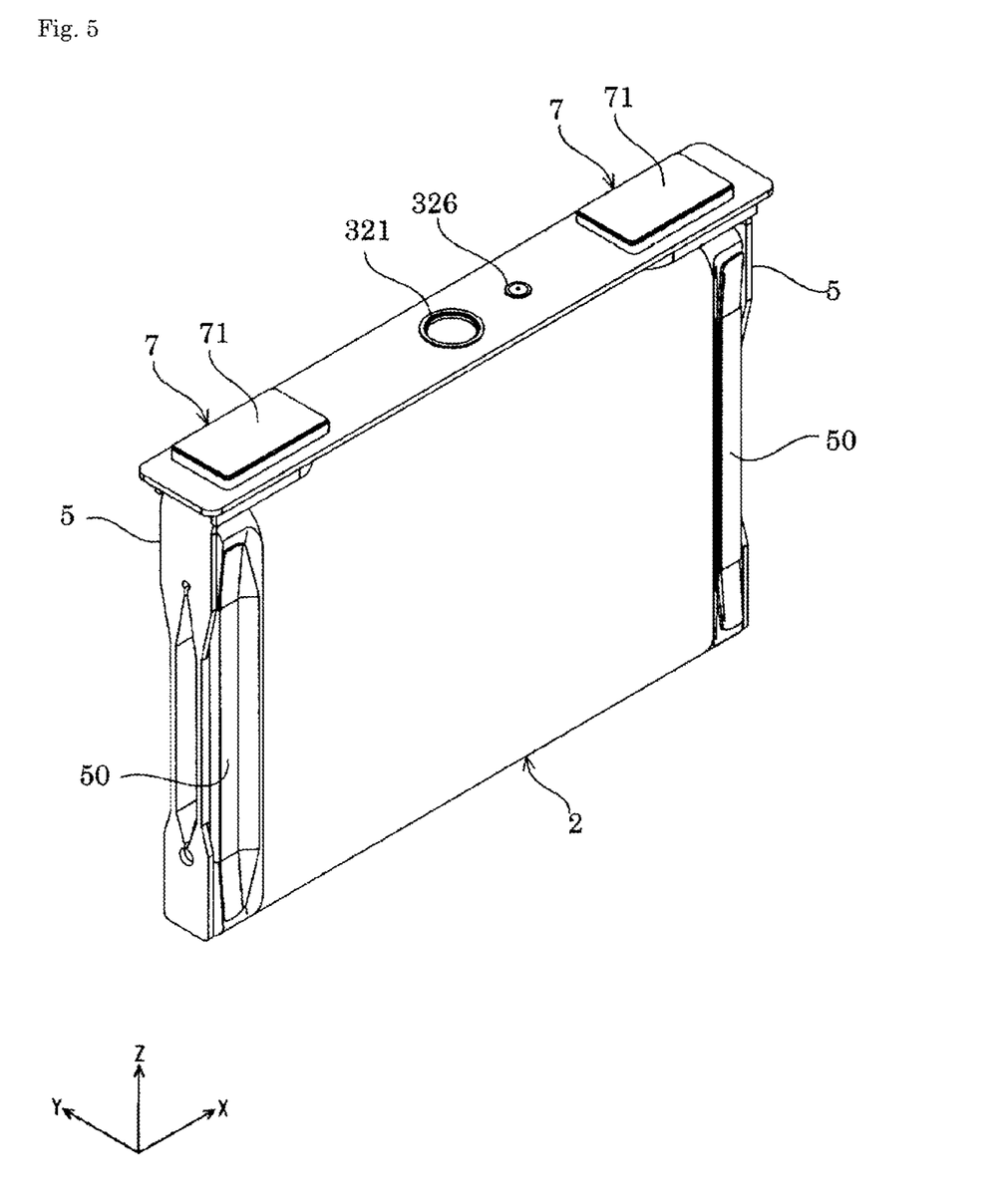
FIG. 5 is a perspective view in a state where a part of the energy storage device according to the embodiment is assembled and an electrolyte filling plug, an electrode assembly, a current collector and an external terminal are assembled on a cover plate.

The current collector 5 is formed of a member having conductivity. As shown in FIG. 3, the current collector 5 is arranged along the inner surface of the case 3. The current collector 5 is disposed on each of the positive electrode 11 and the negative electrode 12 of the energy storage device 1. In the energy storage device 1 of the present embodiment, in the case 3, the current collector 5 is disposed on each of the uncoated layered portion 26 of the positive electrode 11 and the uncoated layered portion 26 of the negative electrode 12 of the electrode assembly 2.

The current collector 5 of the positive electrode 11 and the current collector 5 of the negative electrode 12 are formed of different materials. Specifically, the current collector 5 of the positive electrode 11 is formed of, for example, aluminum or an aluminum alloy, and the current collector 5 of the negative electrode 12 is formed of, for example, copper or a copper alloy.

In the energy storage device 1 of the present embodiment, the electrode assembly 2 (more specifically, the electrode assembly 2 and the current collector 5) in a state of being housed in a bag-shaped insulating cover 6 that insulates the electrode assembly 2 from the case 3 is housed in the case 3.

Next, a method for producing the energy storage device 1 of the above embodiment will be described.

In the method for producing the energy storage device 1, first, a composite containing an active material is applied onto a metal foil (electrode substrate) to form an active material layer, and electrodes (positive electrode 11 and negative electrode 12) are produced. Next, the positive electrode 11, the separator 4, and the negative electrode 12 are overlaid to form the electrode assembly 2. Subsequently, the electrode assembly 2 is placed in the case 3, and the electrolyte solution is put in the case 3 to assemble the energy storage device 1.

In the preparation of the electrode (positive electrode 11), a positive active material layer 112 is formed by applying a composite containing an active material, a binder and a solvent onto both surfaces of a metal foil. As an application method for forming the positive active material layer 112, a common method is adopted. The applied positive active material layer 112 is subjected to roll pressing at a predetermined temperature (for example, 80° C. to 150° C.) and a predetermined pressure (for example, linear pressure of 50 to 500 kg/cm). A density of the positive active material layer 112 can be adjusted by adjusting the pressing pressure. After pressing, vacuum drying is carried out at 80° C. to 140° C. for 12 to 24 hours. The negative electrode is also prepared in the same manner.

In the formation of the electrode assembly 2, the electrode assembly 2 is formed by winding the layered product 22 in which the separator 4 is sandwiched between the positive electrode 11 and the negative electrode 12. Specifically, the positive electrode 11, the separator 4, and the negative electrode 12 are overlaid so that the positive active material layer 112 and the negative active material layer 122 face each other with the separator 4 interposed therebetween to prepare a layered product 22. Subsequently, the layered product 22 is wound to form an electrode assembly 2.

In assembling the energy storage device 1, the electrode assembly 2 is placed in the case main body 31 of the case 3, the opening of the case main body 31 is closed with the cover plate 32, and the electrolyte solution is filled into the case 3. When closing the opening of the case main body 31 with the cover plate 32, the electrode assembly 2 is placed inside the case main body 31 to electrically conduct the positive electrode 11 to the one external terminal 7, and the opening of the case main body 31 is closed with the cover plate 32 in a state in which the negative electrode 12 is electrically conducted to the other external terminal 7. When filling the electrolyte solution into the case 3, the electrolyte solution is filled into the case 3 from the filling hole of the cover plate 32 of the case 3.

In the energy storage device 1 of the present embodiment configured as described above, the volume based particle diameter frequency distribution of graphite has a first peak and a second peak appearing at a larger particle diameter than that of the first peak. A particle diameter of the first peak is 10 µm or less, and a particle diameter of the second peak is larger than 10 µm. Further, as shown in FIG. 8, the particulate graphite G has a pore in which a part of the outer surface enters into an inside of the graphite, and can hold the electrolyte solution in such a pore Z.

The graphite particles can adequately increase the energy density of the energy storage device 1, but when a pressing pressure is too large in preparing the negative active material layer 122, the particle can be deformed since it has a pore Z therein, resulting in a reduction of a volume of the pore Z capable of holding the electrolyte solution. However, as described above, the particle diameter frequency distribution of the particulate graphite G has a first peak having a particle diameter of 10 µm or less and a second peak having a particle diameter larger than 10 µm. Thereby, as shown in FIG. 8, graphite G having a smaller particle diameter is more likely to be filled in the gaps between the graphite G materials having a larger particle diameter and approaching each other. Therefore, even when the pressing pressure is relatively small, the negative active material layer 122 is easily compacted. Moreover, the electrolyte solution enters the inside of the graphite particles, and the entered electrolyte solution can also contribute to the discharge reaction. Therefore, the above energy storage device 1 can have sufficient energy density and sufficient power.

In the above energy storage device 1, the negative active material layer 122 contains, as active materials, graphite and the particulate high hardness active material A (non-graphitizing carbon) having higher hardness than graphite. As the charge-discharge reaction of the energy storage device 1 occurs, the active material repeatedly expands and contracts. Thereby, the negative active material layer 122 undergoes compressive force, and the graphite G having the pore Z inside is pressed, and the volume of the pore Z may decrease. However, since the negative active material layer 122 further contains the high hardness active material A (non-graphitizing carbon), it is possible to prevent the comparatively soft graphite particles from deforming beyond a predetermined amount of deformation by the high hardness active material A (non-graphitizing carbon) having a higher hardness than the graphite. A reduction in the amount of electrolyte solution that graphite can hold inside can be suppressed by such an extent that the deformation of graphite particles can be suppressed. Accordingly, as with the above description, the above-mentioned energy storage device 1 can have more sufficient energy density and more sufficiently power. In addition, the case where the high hardness active material A is non-graphitizing carbon has a smaller change in volume of the high hardness active material due to charge-discharge than that in the case where the high hardness active material A is a material that causes an alloying reaction with lithium ions as described above, and the former case can suppress the brittleness of the high hardness active material A more than the latter case.

In the above energy storage device 1, the average particle diameter of the high hardness active material A is larger than 10 µm. That is, the negative active material layer 122 contains graphite smaller than the high hardness active material A. Thereby, small graphite is more likely to be filled in the gaps between the particles of the high hardness active material A. As a result, deformation of relatively soft and small graphite G beyond a predetermined amount of deformation can be suppressed. Therefore, it is possible to suppress a reduction of a volume of the pore Z inside the graphite. The above energy storage device 1 can surely have sufficient energy density by such an extent that the reduction of a volume of the pore Z into which the electrolyte solution enters can be suppressed and a discharge reaction via the electrolyte solution can be ensured inside the graphite.

Incidentally, the energy storage device of the present invention is not limited to the above-mentioned embodiment, and it is obvious that various modifications may be made without departing from the gist of the invention. For example, the configuration of another embodiment can be added to the configuration of one embodiment, and a part of the configuration of one embodiment can be replaced with the configuration of another embodiment. Furthermore, a part of the configuration of one embodiment can be deleted.

In the above embodiment, the case where the particle diameter frequency distribution of the graphite has a first peak appearing at a smaller particle diameter and a second peak appearing at a larger particle diameter, and the first peak and the second peak are adjacent to each other, has been described. However, in the present invention, the first peak and the second peak are not necessarily adjacent to each other. For example, even if a small peak having a lower frequency (lower peak height) than any of the first peak and the second peak appears between these two peaks while the first peak and the second peak satisfy each condition of the particle diameter of the above-mentioned peak, the peaks appearing on both sides of such a small peak may be set as the first peak and the second peak, respectively.

In the above embodiment, the positive electrode in which the active material layer is in direct contact with the metal foil has been described in detail. However, in the present invention, the positive electrode may have a conductive layer containing a conduction aid and a binder between the active material layer and the metal foil.

In the above embodiment, the electrodes in which the active material layers are disposed on both surfaces of the metal foil of each electrode have been described, but in the energy storage device of the present invention, the positive electrode 11 or the negative electrode 12 may include the active material layer only on one surface of the metal foil.

In the above embodiment, the energy storage device 1 provided with the electrode assembly 2 formed by winding the layered product 22 has been described in detail, but the energy storage device of the present invention may be provided with the layered product 22 not wound. Specifically, the energy storage device may include an electrode assembly in which the positive electrode, the separator, the negative electrode, and the separator each formed in a rectangular shape are stacked in this order plural times.

In the above embodiment, the case where the energy storage device 1 is used as a nonaqueous electrolyte secondary battery (for example, a lithium ion secondary battery) that can be charged and discharged has been described, but the type and the size (capacity) of the energy storage device 1 are optional. Further, in the above embodiment, the lithium ion secondary battery has been described as an example of the energy storage device 1, but the present invention is not limited thereto. For example, the present invention can be applied to various secondary batteries, other primary batteries, and energy storage devices of capacitors such as electric double layer capacitors and lithium ion capacitors.

Figure 9:
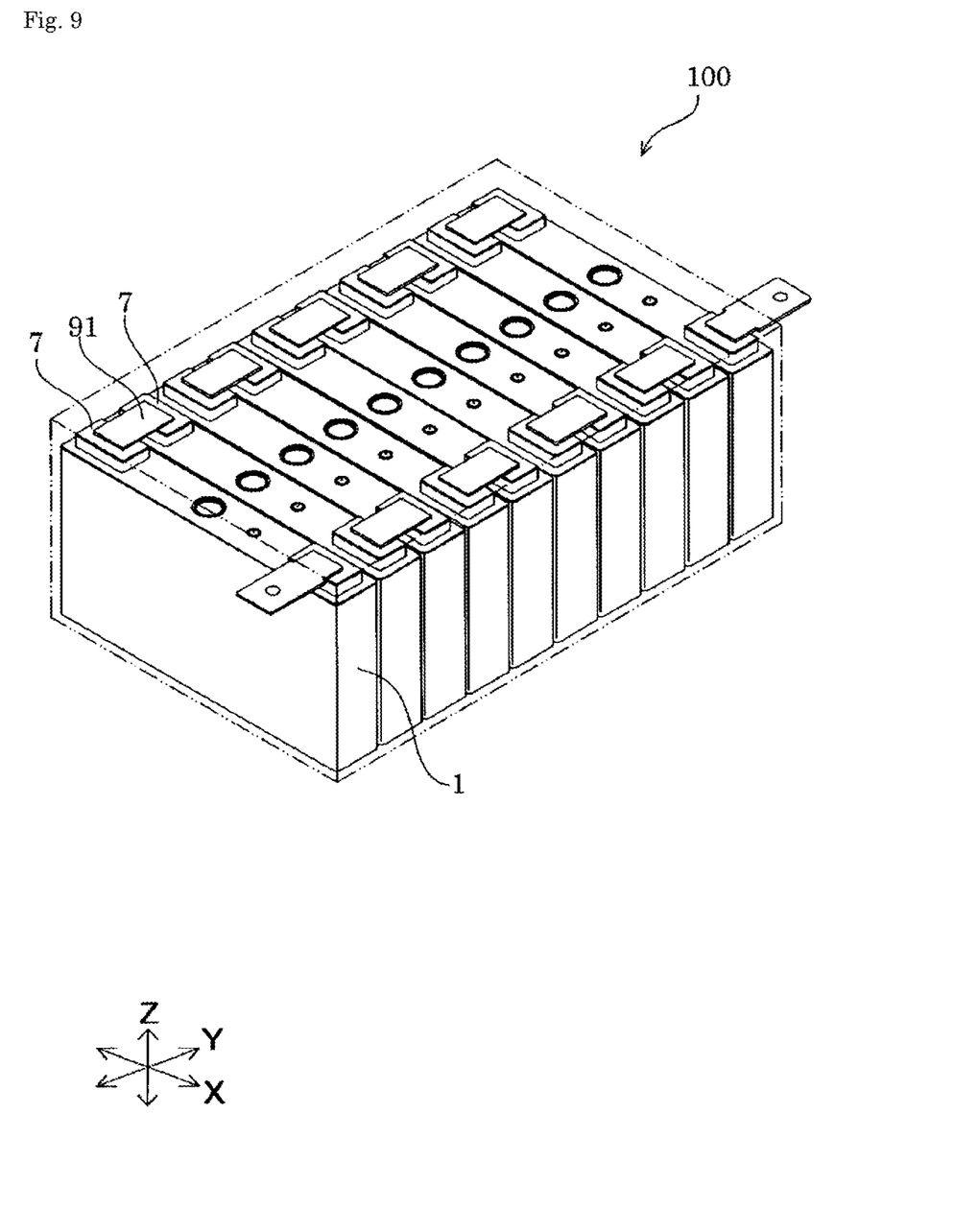
FIG. 9 is a perspective view of an energy storage apparatus including the energy storage device according to the embodiment.

The energy storage device 1 (for example, a battery) may be used for the energy storage apparatus 100 (a battery module in the case where the energy storage device is a battery) as shown in FIG. 9. The energy storage apparatus 100 includes at least two energy storage devices 1 and a bus bar member 91 for electrically connecting the two (different)

energy storage devices 1 to each other. In this case, the technique of the present invention may be applied to at least one energy storage device.

EXAMPLES

A nonaqueous electrolyte secondary battery (lithium ion secondary battery) was produced as follows.

Example 1

(1) Preparation of Positive Electrode)
N-methyl-2-pyrrolidone (NMP) as a solvent, a conduction aid (acetylene black), a binder (PVdF), and particles of an active material ($LiNi_{1/3}Co_{1/3}Mn_{1/3}O_2$) having an average particle diameter D50 of 10 µm were mixed and kneaded to prepare a composite for positive electrode. The compounding amounts of the conduction aid, the binder, and the active material were set to 5 mass %, 5 mass %, and 90 mass %, respectively. The prepared composite for the positive electrode was applied onto a metal foil so that an application amount after drying (weight per unit area) was 8 mg/cm². After drying, roll pressing was performed. Thereafter, the composite was vacuum-dried to remove moisture and the like. A thickness of the active material layer (for one layer) after pressing was 30 µm. A density of the active material layer was 2.5 g/cm³.

(2) Preparation of Negative Electrode
As the active material, two types of particulate graphite having different average particle diameters and particulate non-graphitizing carbon (hard carbon) were used. Details of the active material are as follows.

Graphite with smaller average particle diameter: Product name "SG 5" produced by BTR New Energy Material Ltd.
Particles having an average particle diameter of 8 µm, pores inside, Vickers hardness 50
Graphite with larger average particle diameter: Product name "SG 17" produced by BTR New Energy Material Ltd.
Particles having an average particle diameter of 18 µm, pores inside, Vickers hardness 50
As a binder, PVdF was used. A composite for the negative electrode was prepared by mixing and kneading NMP as a solvent, a binder, and an active material. The binder was mixed so as to be 7 mass %, and the active materials were mixed so as to be 93 mass % in total. In the active material, the mass ratio between graphite having a smaller particle diameter and graphite having a larger particle diameter was 2:7. The prepared composite for the negative electrode was applied onto both surfaces of a copper foil (10 µm thickness) so that an application amount after drying (weight per unit area) was 4.0 mg/cm². After drying, roll pressing was performed and vacuum drying was performed to remove moisture and the like. A thickness of the active material layer (for one layer) was 35 µm. A density of the active material layer was 1.2 g/cm³. A porosity of the active material layer was 40%.

(3) Separator
A microporous polyethylene membrane having a thickness of 22 µm was used as a separator. An air permeability of the microporous polyethylene membrane was 100 second/100 cc.

(4) Preparation of Electrolyte Solution
As the electrolyte solution, one prepared by the following method was used. Using a solvent in which 1 part by mass of each of ethylene carbonate, dimethyl carbonate, and ethyl methyl carbonate was mixed as a nonaqueous solvent, $LiPF_6$ was dissolved in the nonaqueous solvent such that the salt concentration was 1 mol/L, electrolysis to prepare an electrolyte solution.

(5) Arrangement of Electrode Assembly in Case
A battery was produced by a general method using the positive electrode, the negative electrode, the electrolyte solution, and the separator described above, and a case.
First, a sheet-like material in which a separator was disposed between the positive electrode and the negative electrode and layered was wound. Next, the wound electrode assembly was placed in a case main body of a prismatic container case made of aluminum as a case. Subsequently, the positive electrode and the negative electrode were electrically connected to the two external terminals, respectively. Furthermore, a cover plate was attached to the case main body. The above electrolyte solution was filled into the case from the electrolyte solution filling hole formed on the cover plate of the case. Finally, the case was sealed by sealing the electrolyte solution filling hole of the case.

Particle Diameter Frequency Distribution of Active Material (Graphite, Hard carbon) in active material layer of negative electrode The active material layer of the negative electrode was taken out from the battery once produced. The active material layer was immersed in a solvent (N-methylpyrrolidone, NMP) that dissolves the binder of the active material layer to dissolve the binder. An undissolved material was separated by filtration and dried. Thereafter, the particle diameter frequency distribution of the active material was measured using a particle diameter distribution measurement apparatus. A laser diffraction type particle diameter distribution measurement apparatus ("SALD 2200" manufactured by Shimadzu Corporation) was used as a measurement apparatus, and a dedicated application software DMS ver. 2 was used as a measurement control software program. As a specific measuring method, a scattering type measurement mode was adopted, a wet cell in which a dispersion liquid containing a measurement sample (active material) dispersed therein circulates was placed in an ultrasonic environment for 2 minutes, and then was irradiated with laser light to obtain scattered light distribution from the measurement sample. Then, the scattered light distribution was approximated by a log-normal distribution, and the particle diameter was measured within a range where the minimum was set to 0.021 µm and the maximum was set to 2000 µm in the particle diameter frequency distribution (horizontal axis, σ) to obtain a particle diameter frequency distribution. Further, the dispersion also contains a surfactant and SN Dispersant 7347-C(product name) or Triton X-100 (product name) as a dispersant. Several drops of the dispersant were added to the dispersion liquid. When hard carbon is further used as an active material, prior to measurement of the particle diameter frequency distribution, the graphite (2.2 g/cc) and the hard carbon (1.5-2.1 g/cc) as active materials are separated using a centrifugal separator or a specific gravity gradient tube.

Particle diameter D1 of First Peak, particle diameter D2 of Second Peak

There were two peaks in the particle diameter frequency distribution. The particle diameter at the local maximum point of the peak with the smaller particle diameter was taken as the particle diameter D1 of the first peak. The particle diameter D1 was 8 µm. On the other hand, the particle diameter at the local maximum point of the peak with the larger particle diameter was taken as the particle diameter D2 of the second peak. The particle diameter D2 was 18 µm.

Examples 2 to 10

A lithium ion secondary battery was produced in the same manner as in Example 1 except that the battery was changed to have the constitution shown in Table 1.

In addition, in Examples in which non-graphitizing carbon (hard carbon) (see below) was further used as an active material, the mass ratio between graphite having a smaller particle diameter and graphite having a larger particle diameter was 2:7.

Non-graphitizing carbon (hard carbon): manufactured by Kureha Battery Materials Co., Ltd.
Product name "Carbotron P (F)"
Particles having an average particle diameter of 22 μm, pores inside, Vickers hardness 200

Average particle diameter of high hardness active material (hard carbon)

A particle diameter was measured in the same manner as in the measurement of the particle diameter frequency distribution of graphite except that hard carbon was separated from the active material. The particle diameter corresponding to the cumulative degree of 50% (D50) in the particle diameter frequency distribution was taken as the average particle diameter.

The above mass ratio between graphite having a smaller particle diameter and graphite having a larger particle diameter and the compounding amount of non-graphitizing carbon in the active material layer shown in Table 1 are merely specific examples. As described above, any energy storage device having a particle diameter of the first peak of 10 μm or less and a particle diameter of the second peak larger than 10 μm is included in the present invention.

Comparative Examples 1 to 4

A lithium ion secondary battery was produced in the same manner as in Example 1 and Example 4 except that the battery was changed so as to have the constitution shown in Table 1.

<Evaluation of Energy Density>

For each of the produced batteries, charge-discharge at 3 CA was repeated 100 cycles at a voltage between 3.0 V and 4.2 V. Thereafter, an energy density during discharging at 3CA was measured. Table 1 shows the relative values of the energy density of each battery, assuming that the energy density in the battery of Example 1 is 100.

<Evaluation of Power Performance>

For each of the produced batteries, charge-discharge at 3 CA was repeated 100 cycles at a voltage between 3.0 V and 4.2 V. After that, the reciprocal of a voltage drop immediately after the discharge started from the full charge was obtained as the power performance. Table 1 shows the relative values of the power performance of each battery assuming that the power performance of the battery of Example 1 is 100.

In the batteries of Examples, the energy density was sufficient, and the power performance was sufficiently exhibited. On the other hand, in the batteries of Comparative Examples, either energy density or power performance was not necessarily sufficient.

The reason for this is as follows. That is, in each of the batteries of the above Examples, the negative active material layer contains graphite and a particulate high hardness active material (non-graphitizing carbon) having higher hardness than graphite as the active material. As the charge-discharge reaction of the energy storage device occurs, the active material repeatedly expands and contracts. Thereby, the negative active material layer receives a compressive force, and the graphite particles are pressed and deformed. However, since the negative active material layer further contains a high hardness active material (non-graphitizing carbon), the high hardness active material can suppress, by playing the role of a pillar, deformation of relatively soft graphite particles beyond a predetermined amount of deformation. A reduction in the amount of electrolyte solution that graphite can hold inside can be suppressed by such an extent that the deformation of graphite particles can be suppressed. There-

TABLE 1

|  | Particle diameter D1 of First Peak [μm] | Particle diameter D2 of First Peak [μm] | Average Particle diameter D50 of Hard Carbon [μm] | Compounding Amounts of Hard Carbon [mass %] | Energy Density (relative value) | Power Performance (relative value) |
|---|---|---|---|---|---|---|
| Comparative Example 1 | 8 | 18 | — | — | 100 | 100 |
| Comparative Example 2 | 9 | 11 | — | — | 100 | 100 |
| Reference Example | 5 | 15 | — | — | 110 | 110 |
| Example 1 | 8 | 18 | 22 | 10 | 110 | 120 |
| Example 2 | 8 | 18 | 9 | 10 | 110 | 110 |
| Example 3 | 8 | 18 | 22 | 5 | 110 | 110 |
| Example 4 | 8 | 18 | 5 | 10 | 110 | 100 |
| Example 5 | 8 | 15 | 22 | 10 | 110 | 120 |
| Example 6 | 5 | 15 | 22 | 10 | 110 | 130 |
| Example 7 | 9 | 11 | 22 | 10 | 110 | 110 |
| Comparative example 3 | 12 | 18 | 22 | 10 | 90 | 100 |
| Comparative example 4 | 8 | — | 22 | 10 | 90 | 90 |
| Comparative example 5 | — | 18 | 22 | 10 | 90 | 90 |
| Comparative example 6 | — | 18 | — | — | 90 | 80 | fore, it is presumed that each of the batteries of Examples described above could have more sufficient energy density and more sufficient power.

DESCRIPTION OF REFERENCE SIGNS

1: Energy storage device (nonaqueous electrolyte secondary battery)
2: Electrode assembly
26: Uncoated layered portion
3: Case
31: Case main body
32: Cover plate
4: Separator
5: Current collector
50: Clip member
6: Insulation cover
7: External terminal
71: Surface
11: Positive electrode
111: Metal foil of a positive electrode (positive substrate)
112: Positive active material layer
12: Negative electrode
121: Metal foil of a negative electrode (negative substrate)
122: Negative active material layer
91: Bus bar member
100: Energy storage apparatus

The invention claimed is:

1. An energy storage device comprising a negative electrode containing an active material layer including an active material,
wherein the active material layer includes particulate graphite as the active material,
the graphite includes primary particles,
a particle diameter frequency distribution of the primary particles of the graphite includes a first peak and a second peak which appears in a region where a particle diameter is larger than a particle diameter of the first peak,
the particle diameter of the first peak is equal to or less than 10 μm and the particle diameter of the second peak is more than 10 μm, and
the active material layer further includes a particulate high hardness active material composed of a material which has higher Vickers hardness than the graphite.

2. The energy storage device according to claim 1, wherein the high hardness active material comprises particulate non-graphite carbon.

3. The energy storage device according to claim 1, wherein an average particle diameter of the high hardness active material is more than 10 μm.

4. The energy storage device according to claim 1, wherein the average particle diameter of the high hardness active material is more than the particle diameter of the second peak.

5. The energy storage device according to claim 1, wherein the graphite comprises a pore in an inside thereof.

6. The energy storage device according to claim 1, wherein a ratio (D2/D1) of the particle diameter D2 of the second peak to the particle diameter D1 of the first peak is 3 or less.

* * * * *

UNITED STATES PATENT AND TRADEMARK OFFICE
CERTIFICATE OF CORRECTION

PATENT NO. : 10,629,909 B2
APPLICATION NO. : 15/781666
DATED : April 21, 2020
INVENTOR(S) : Takeshi Sasaki et al.

It is certified that error appears in the above-identified patent and that said Letters Patent is hereby corrected as shown below:

On the Title Page (12), delete "Saski et al." and insert --Sasaki et al.--.

(72) Inventors:, delete "Takeshi Saski" and insert --Takeshi Sasaki--.

Signed and Sealed this
First Day of September, 2020

Andrei Iancu
*Director of the United States Patent and Trademark Office*